United States Patent
Hosaka et al.

(10) Patent No.: US 12,361,088 B2
(45) Date of Patent: Jul. 15, 2025

(54) WEB BROWSER SYSTEM, COMMUNICATION TERMINAL, AND METHOD FOR CONTROLLING THE SAME

(71) Applicant: CANON KABUSHIKI KAISHA, Tokyo (JP)

(72) Inventors: Anna Hosaka, Ibaraki (JP); Takeshi Kogure, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/344,548

(22) Filed: Jun. 29, 2023

(65) Prior Publication Data
US 2024/0004944 A1  Jan. 4, 2024

(30) Foreign Application Priority Data
Jul. 1, 2022 (JP) .................. 2022-106862

(51) Int. Cl.
| | |
|---|---|
| G06F 16/00 | (2019.01) |
| G06F 16/9538 | (2019.01) |
| G06F 16/955 | (2019.01) |
| H04L 67/56 | (2022.01) |

(52) U.S. Cl.
CPC ........ *G06F 16/9538* (2019.01); *G06F 16/955* (2019.01); *H04L 67/56* (2022.05)

(58) Field of Classification Search
CPC ... G06F 16/9538; G06F 16/955; H04L 67/56; H04L 67/02; H04L 67/563
See application file for complete search history.

(56) References Cited

U.S. PATENT DOCUMENTS

| | | | | |
|---|---|---|---|---|
| 2012/0324113 A1* | 12/2012 | Prince | ................. | H04L 61/4511 709/226 |
| 2015/0310126 A1* | 10/2015 | Steiner | ................ | G06F 16/9574 715/204 |
| 2022/0066810 A1 | 3/2022 | Ikeda | | |
| 2023/0367833 A1* | 11/2023 | Kol | ........... | G06F 9/455 |

FOREIGN PATENT DOCUMENTS

JP  2022041717 A  3/2022

* cited by examiner

*Primary Examiner* — Paul Kim
(74) *Attorney, Agent, or Firm* — Canon U.S.A., Inc. IP Division

(57) ABSTRACT

A web browser system includes an image generation server configured to render a web page, a proxy server configured to monitor communication, and a communication terminal, wherein the communication terminal includes one or more memories, and one or more processors, wherein the one or more processors and the one or more memories are configured to acquire a Uniform Resource Locator (URL) of an access destination, notify the proxy server of the URL, acquire a status code corresponding to the URL from the proxy server, and request the image generation server to render the web page corresponding to the URL in a case where the status code is a predetermined status code.

9 Claims, 12 Drawing Sheets

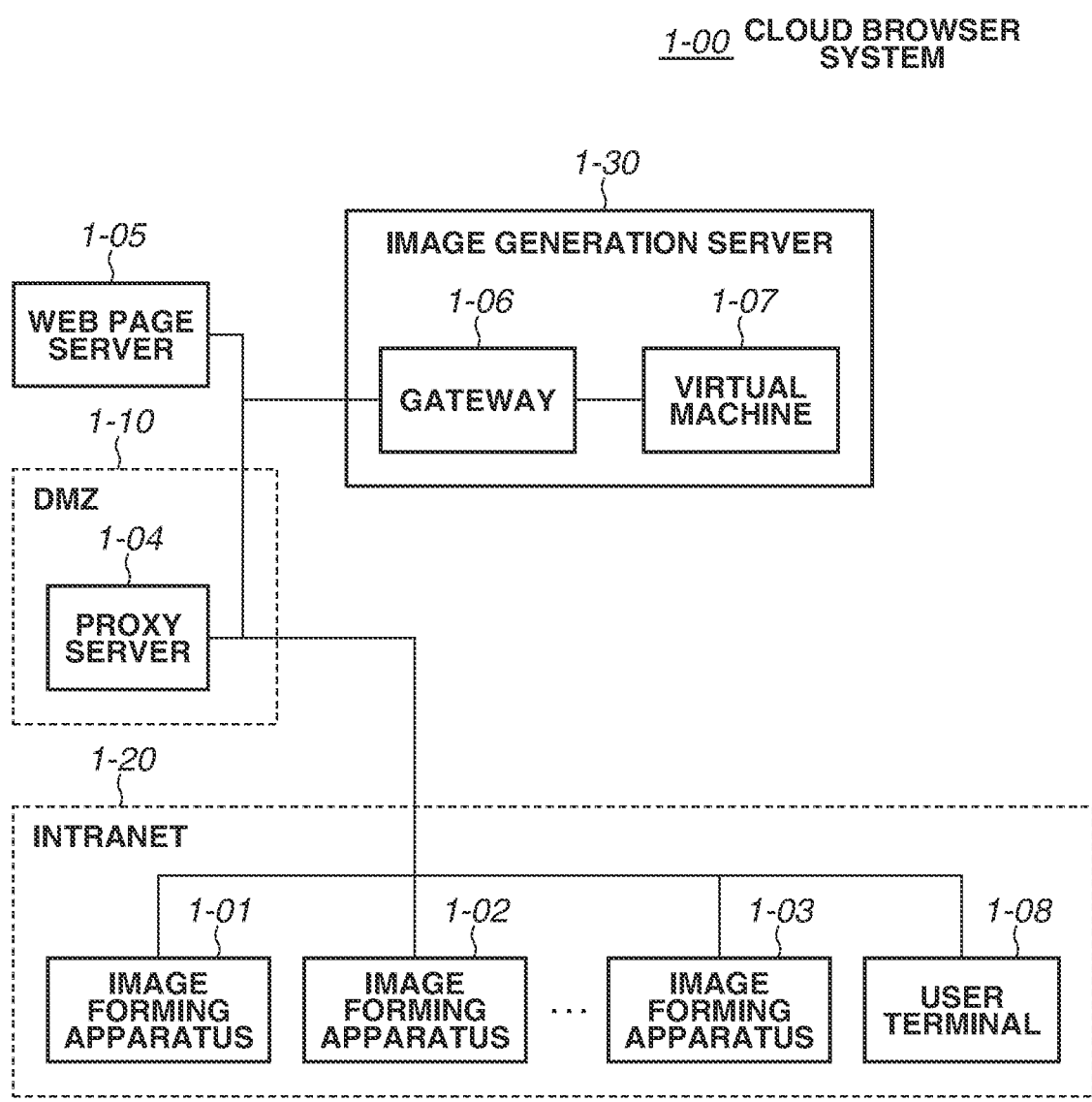

CLOUD BROWSER SETTINGS

☑ USE CLOUD BROWSER —4-01

☑ USE HTTP PROXY —4-02

HOST: [ ]   PORT: [ ]

☑ USE PROXY AUTHENTICATION —4-03

ID: [ ]   PASSWORD: [ ]

*4-04*

☑ SPECIFY URL TO BE DISPLAYED WHEN BROWSER IS ACTIVATED

URL: [ ]

☑ USE PROXY SETTING FILE —4-05

FILE: [ ]

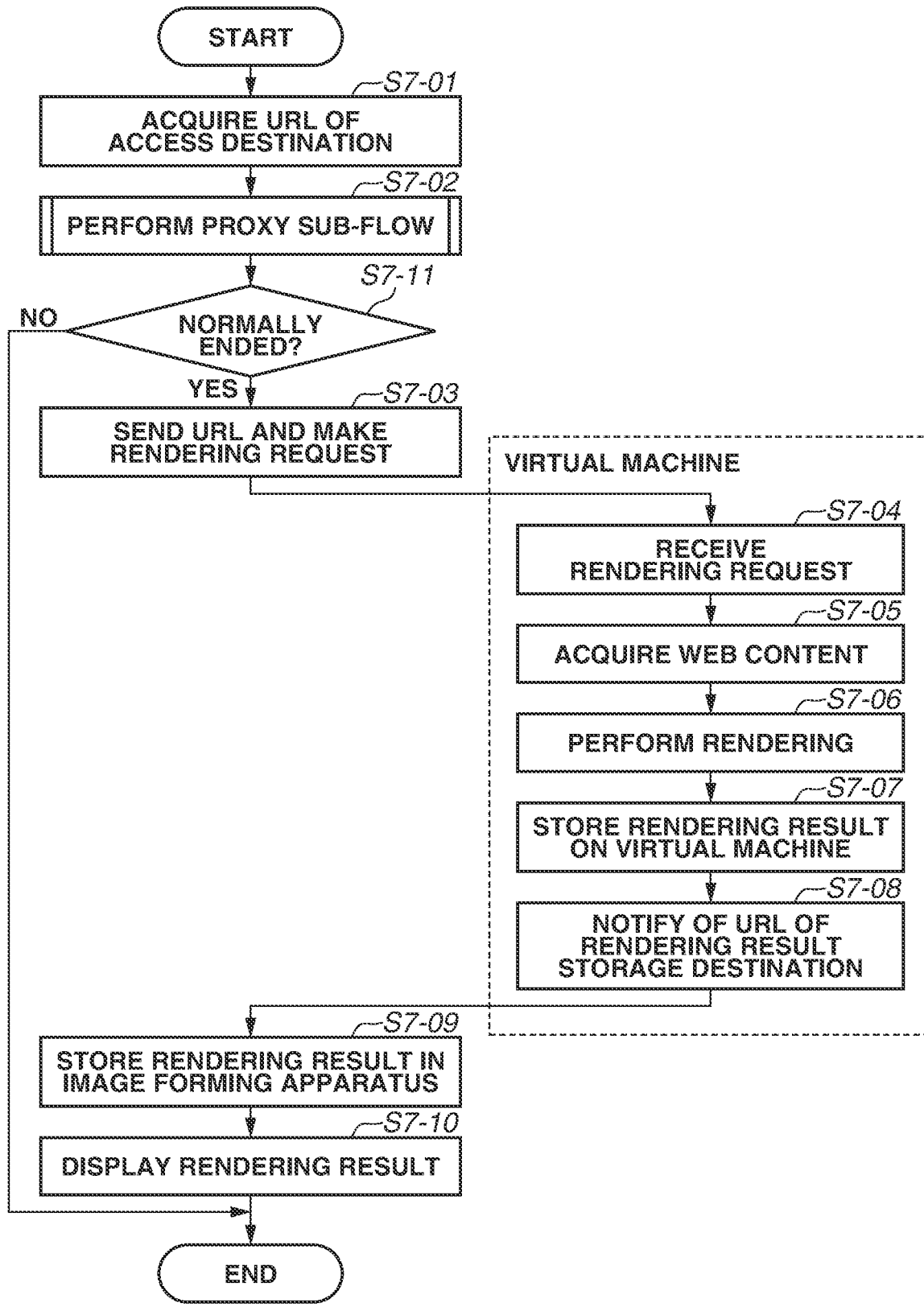

FIG.9

| RESPONSE CODE | PROCESSING CONTENT |
| --- | --- |
| 20X | PERMISSION |
| 30X | REDIRECTION |
| 407 | PROXY SETTING |
| 503 | RESTRICTION |
| . . . | . . . |

WEB BROWSER SYSTEM, COMMUNICATION TERMINAL, AND METHOD FOR CONTROLLING THE SAME

BACKGROUND

Field of the Disclosure

The present disclosure relates to a communication terminal used for a web browser system. This communication terminal is applicable to image processing apparatuses, such as printers, scanners, facsimiles, and multi-function peripherals (MFPs) having the printer, scanner and facsimile functions, and is also applicable to general-purpose information processing apparatuses, such as personal computers and mobile terminals.

Description of the Related Art

Communication terminals such as image processing apparatuses (information processing apparatuses) are conventionally known to be provided with a web browser (hereinafter also referred to as a browser) and a function of viewing web pages on the browser. A communication terminal that accesses a web page of an external service via a web browser can extend functions by cooperating with the external service. When a web browser is used in this way, techniques for restricting access via a proxy and recording an access history may be used to ensure security in a specific environment.

In these days, there has been studied a mechanism called a cloud browser that uses an image generation server for generating a result of drawing a web page on a cloud server. Japanese Patent Application Laid-Open No. 2022-41717 discusses a system that renders a web page on a virtual machine on a network different from a network on which a communication terminal is, and displays the rendering result on the communication terminal. In such a system, a server performs processing with a high calculation load, such as processing for analyzing and executing a web page, thereby making it possible to reduce specification requirements of the communication terminal.

SUMMARY

According to an aspect of the present disclosure, a web browser system includes an image generation server configured to render a web page, a proxy server configured to monitor communication, and a communication terminal, wherein the communication terminal includes one or more memories, and one or more processors, wherein the one or more processors and the one or more memories are configured to acquire a Uniform Resource Locator (URL) of an access destination, notify the proxy server of the URL, acquire a status code corresponding to the URL from the proxy server, and request the image generation server to render the web page corresponding to the URL in a case where the status code is a predetermined status code.

Further features of various embodiments will become apparent from the following description of exemplary embodiments with reference to the attached drawings.

BRIEF DESCRIPTION OF THE DRAWINGS

FIG. 1 is a block diagram illustrating an overall configuration of a cloud browser system.

FIG. 4 illustrates a setting screen of the cloud browser.

FIG. 7 is a flowchart illustrating processing performed by the image forming apparatus and the virtual machine.

FIG. 9 illustrates a proxy determination table held by the cloud browser.

DESCRIPTION OF THE EMBODIMENTS

Figure 2A:
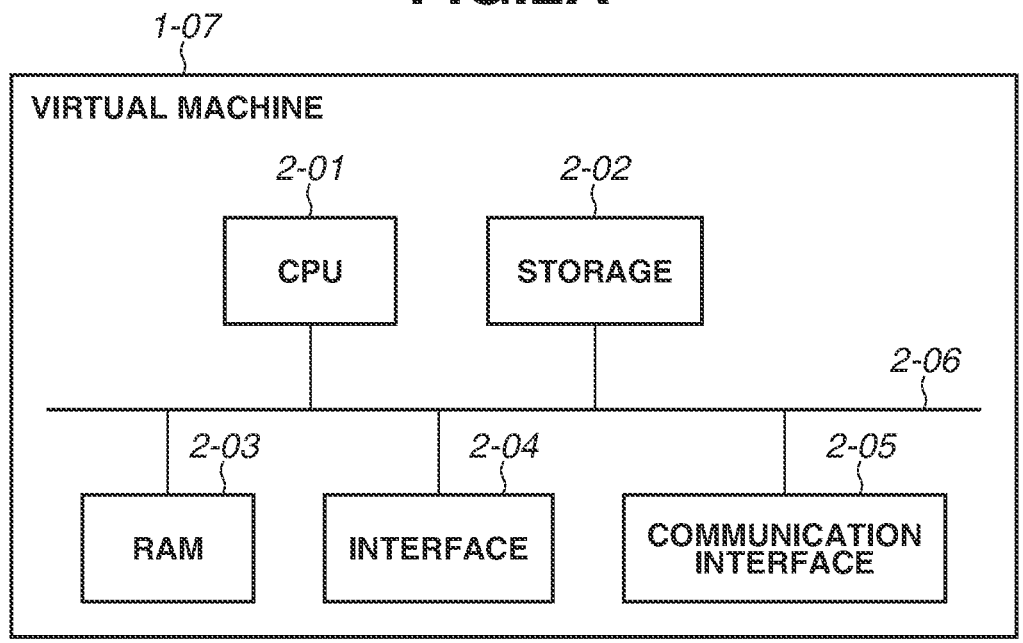
FIG. 2A is a block diagram illustrating a hardware configuration of a virtual machine.

Exemplary embodiments of the present disclosure will be described in detail below with reference to the accompanying drawings. The scopes of some embodiments of the present disclosure are not limited to the configurations of the exemplary embodiments. To the extent that similar effects can be obtained, modifications for, for example, partially replacing components or processing with equivalents or partially omitting components or processing can be made.

A first exemplary embodiment will be described below. FIG. 1 illustrates an overall configuration of a cloud browser system. A cloud browser system 1-00 is a web browser system that renders web content on a cloud. The cloud browser system 1-00 includes a plurality of image forming apparatuses 1-01, 1-02, and 1-03, an image generation server 1-30 to which the image forming apparatuses 1-01, 1-02, and 1-03 are connected, a web page server 1-05 that provides web pages, and a proxy server 1-04. The example in FIG. 1 includes one image generation server 1-30 and three image forming apparatuses 1-01 to 1-03. However, any number of image forming apparatuses may be connected to the image generation server 1-30. The image generation server 1-30 is configured to provide the plurality of image forming apparatuses 1-01, 1-02, and 1-03 with services in a parallel manner or in a time-sharing manner. Accordingly, in the cloud browser system 1-00, the number of image generation servers 1-30 is relatively smaller than the number of image forming apparatuses. The cloud browser system 1-00 may include a plurality of image generation servers for the purpose of load distribution. The relation between each image forming apparatus and the image generation server 1-30 will be described below taking the image forming apparatus 1-01 as an example that represents the plurality of image forming apparatuses.

The image generation server 1-30 is a system on the cloud, and provides services for substituting rendering of web content. The image generation server 1-30 includes a gateway 1-06 and a virtual machine 1-07. As described in detail below, a browser engine as a software module operates on the virtual machine 1-07 of the image generation server 1-30. The browser engine receives a Uniform Resource Locator (URL) transmitted from the image forming apparatus 1-01, via the gateway 1-06. Then, the browser engine accesses the web page corresponding to the received URL, via the gateway 1-06, and receives web content, such as a HyperText Markup Language (HTML), from the web page. Subsequently, another software module for performing rendering generates a rendering result (rendering image) of the received web content. The rendering result is transmitted to the image forming apparatus 1-01 via the gateway 1-06.

The image forming apparatus 1-01 is an image processing apparatus (information processing apparatus or communication terminal) having a function of forming (printing) an image on a sheet (paper) or a function of scanning an image and sending generated image data to an optional destination. The image forming apparatus 1-01 may be either a multifunction peripheral (MFP) or a single function printer (SFP). The printing method of the image forming apparatus 1-01 may be either an electrophotographic method or an ink-jet method. The image forming apparatus 1-01 according to the present exemplary embodiment is characterized in using the image generation server 1-30 to browse and display web content on the Internet. The characteristics of the image forming apparatus 1-01 will be described in detail below.

The image forming apparatus 1-01 exists in an intranet 1-20 and communicates with other apparatuses in the intranet 1-20. For example, the image forming apparatus 1-01 can receive print data from a user terminal 1-08. The image forming apparatus 1-01 can also function as a web server and provide the user terminal 1-08 with web pages.

The proxy server 1-04 monitors and restricts communication performed inside and outside the intranet 1-20. The proxy server 1-04 performs URL filtering (web filtering) to restrict access to web sites. The proxy server 1-04 performs the access restriction by using a list of web sites inhibited to be accessed or a list of web sites permitted to be accessed. Each apparatus in the intranet 1-20 connects to the Internet via or without the proxy server 1-04 depending on the settings held by each apparatus. For example, referring to FIG. 1, if the user operates the image forming apparatus 1-01 to input a request for viewing the web page server 1-05, the image forming apparatus 1-01 transmits the address (hereinafter referred to as a URL) of the web page server 1-05 to the image generation server 1-30 via the proxy server 1-04. The proxy server 1-04 is set in a Demilitarized Zone (DMZ) 1-10. The DMZ 1-10 is a segment isolated from the intranet 1-20 to enhance security.

Virtual Machine

FIG. 2A is a block diagram illustrating a hardware configuration of the virtual machine 1-07.

The virtual machine 1-07 includes a central processing unit (CPU) 2-01, a storage 2-02, a random access memory (RAM) 2-03, an interface 2-04, and a communication interface 2-05. These components are communicably connected with each other via a bus 2-06.

The CPU 2-01 performs various processing using computer programs and data stored in the storage 2-02. Thus, the CPU 2-01 controls the overall operation of the virtual machine 1-07, and the CPU 2-01 performs or controls each piece of processing described as being performed by the virtual machine 1-07.

The storage 2-02 stores setting data of the virtual machine 1-07, computer programs and data related to the activation of the virtual machine 1-07, and computer programs and data related to basic operations of the virtual machine 1-07. The RAM 2-03 includes an area for storing computer programs and data loaded from the storage 2-02 and data received from an external apparatus via the communication interface 2-05. The RAM 2-03 further includes a work area used by the CPU 2-01 to perform various processing. In this manner, the RAM 2-03 can suitably provide various types of storage areas.

The interface 2-04 includes a display unit configured to display displaying results of processing performed by the CPU 2-01 by using images and texts, and an operation unit to be operated by the user to input various operations. The display unit includes a liquid crystal display screen and a touch panel screen. The operation unit includes user interfaces such as a keyboard, a mouse, and a touch panel screen.

The communication interface 2-05 is an interface for performing data communication with an external apparatus.

The configuration illustrated in FIG. 2A is to be considered as an example of a configuration applicable to the virtual machine 1-07, and is not intended to restrict the configuration to the one illustrated in FIG. 2A. For example, a memory device may be connected to the bus 2-06 in the configuration illustrated in FIG. 2A. Examples of the memory device include a hard disk drive, a Universal Serial Bus (USB) memory, a magnetic card, an optical card, an integrated circuit (IC) card, a memory card, and a drive device. Examples of the drive device include a drive apparatus of a storage medium, such as a flexible disk (FD), a compact disk (CD), and other optical disks. The virtual machine 1-07 can be configured by a virtual technology, and is capable of organizing various resources configuring a computer system in logical units independently of physical configurations. More specifically, a plurality of resources can be integrated to configure the virtual machine 1-07. Alternatively, one resource can be divided into pieces, and one of the pieces can be configured as the virtual machine 1-07. More specifically, the virtual machine 1-07 can be configured by using at least a part of a plurality of resources (which can be configured by a plurality of devices) of an information processing system configuring a cloud.

Figure 2B:
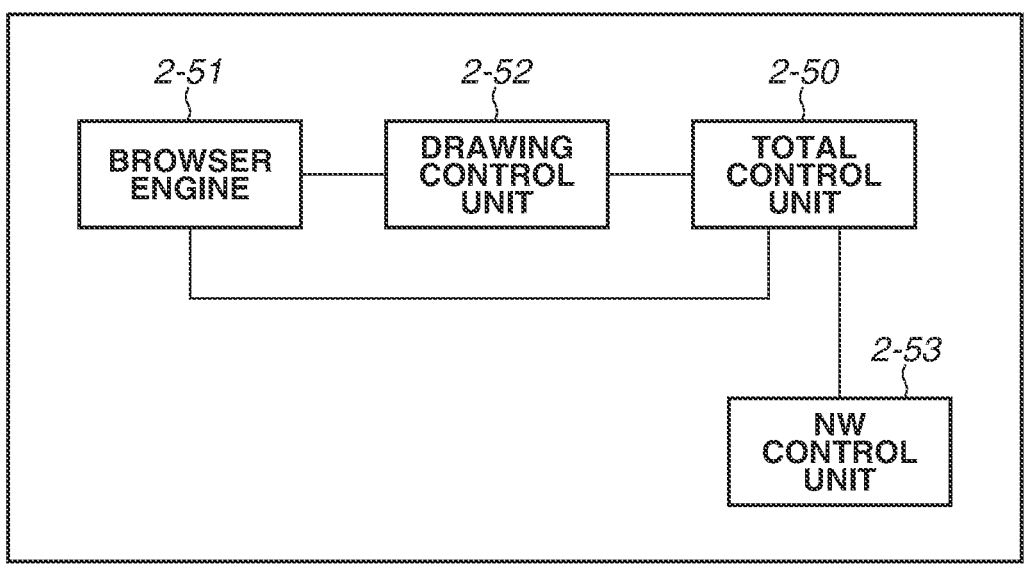
FIG. 2B is a block diagram illustrating a software configuration of the virtual machine.

FIG. 2B illustrates a software configuration of the virtual machine 1-07 operating on the cloud browser system. A total control unit 2-50 is a module that controls the entire virtual machine 1-07 of the cloud browser system 1-00. A network (NW) control unit 2-53 is a module that receives communication from the external apparatus and transmits data via the communication interface 2-05. The NW control unit 2-53 receives a rendering request for web content specified by a URL and then notifies the total control unit 2-50 of the rendering request. Rendering refers to generating an image based on abstract high-order information written in a data description language or a data structure. The total control unit 2-50 receives the rendering request and then notifies a browser engine 2-51 of the specified URL. The browser engine 2-51 requests the NW control unit 2-53 to acquire the web content of the specified URL. The NW control unit 2-53 accesses the URL via a specified proxy to acquire the web content. The browser engine 2-51 requests a drawing control unit 2-52 to draw information about the acquired web content. The total control unit 2-50 notifies an external communication apparatus of the image data drawn by the drawing control unit 2-52, via the NW control unit 2-53.

Image Forming Apparatus

Figure 3A:
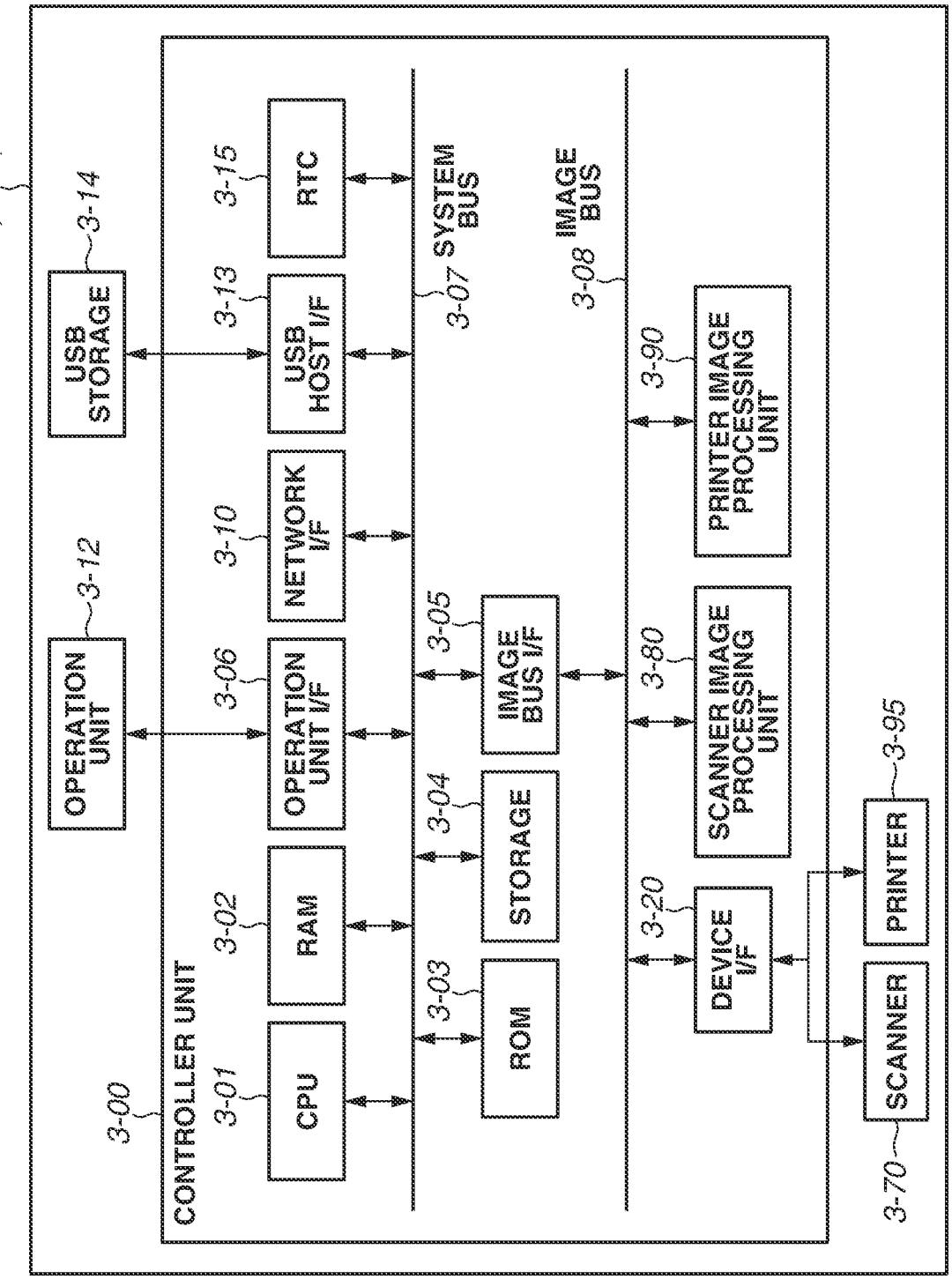
FIG. 3A is a block diagram illustrating a hardware configuration of an image forming apparatus.

FIG. 3A illustrates a hardware configuration of the image forming apparatus 1-01. The image forming apparatus 1-01 includes a controller unit 3-00, an operation unit 3-12, a USB storage 3-14, a scanner 3-70, and a printer 3-95.

The operation unit 3-12 displays information to the user and receives a user input.

The operation unit 3-12 includes, for example, a display, a touch panel sensor, and hardware keys.

The USB storage 3-14 is an external storage device for storing data. The USB storage 3-14 is attachable to and detachable from a USB host interface (I/F) 3-13.

The scanner 3-70 is an image reading unit (image reading device or image input device) for reading an image from a document.

The printer 3-95 is an image forming unit (image forming device or image output device) for forming an image on a sheet (paper).

The controller unit 3-00 is a control unit including components for performing various types of control in the image forming apparatus 1-01. For example, the controller unit 3-00 performs control to implement a copy function for reading image data via the scanner 37-0 and printing the image via the printer 3-95.

The controller unit 3-00 includes a CPU 3-01, a RAM 3-02, a read only memory (ROM) 3-03, a storage 3-04, and an image bus I/F 3-05. These components are communicably connected with each other via a system bus 3-07.

The controller unit 3-00 also includes an operation unit I/F 3-06, a network I/F 3-10, the USB host I/F 3-13, a Real-Time Clock (RTC) 3-15, a device I/F 3-20, a scanner image processing unit 3-80, and a printer image processing unit 3-90. These components are communicably connected with each other via the image bus I/F 3-05 and an image bus 3-08.

The CPU 3-01 activates an operation system (OS) by executing a boot program stored in the ROM 3-03. On the OS, the CPU 3-01 executes programs stored in the storage 3-04 to implement various pieces of processing. The CPU 3-01 uses the RAM 3-02 as a work area. The RAM 3-02 provides not only the work area but also an image memory area for temporarily storing image data.

The storage 3-04 is a storage unit configured to store programs and image data. A Hard Disk Drive (HDD), a Solid State Drive (SSD), and an embedded Multi Media Card (eMMC) can be used as the storage 3-04.

The CPU 3-01 is connected with the ROM 3-03, the RAM 3-02, the operation unit OF 3-06, the network OF 3-10, the USB host OF 3-13, and the image bus OF 3-05 via the system bus 3-07. The operation unit OF 3-06 serves as an interface with the operation unit 3-12 and outputs the image data to be displayed on the operation unit 3-12 to the operation unit 3-12. The operation unit OF 3-06 sends out information input by the user via the operation unit 3-12, to the CPU 3-01. The network OF 3-10 is an interface for connecting the image forming apparatus 1-01 to a Local Area Network (LAN).

The USB host OF 3-13 is an interface that communicates with the USB storage 3-14. The USB host OF 3-13 is an output unit for causing the USB storage 3-14 to store the data stored in the storage 3-04. The USB host OF 3-13 inputs data stored in the USB storage 3-14 and transmits the data to the CPU 3-01. A plurality of USB devices including the USB storage 3-14 can be connected to the USB host OF 3-13.

The RTC 3-15 controls the current time. Time information controlled by the RTC 3-15 is used to record the time when a job is entered.

The image bus OF 3-05 is a bus bridge that connects the system bus 3-07 and the image bus 3-08 to transfer image data at high speed, and converts the data format. On the image bus 3-08, the device OF 3-20, the scanner image processing unit 3-80, and the printer image processing unit 3-90 are disposed. The device I/F 3-20 is connected with the scanner 3-70 and the printer 3-95, and performs synchronous and asynchronous conversion on image data. The scanner image processing unit 3-80 subjects input image data to correction, processing, and editing. The printer image processing unit 3-90 performs correction and resolution conversion suitable for the printer 3-95 on image data to be printed and output.

Figure 3B:
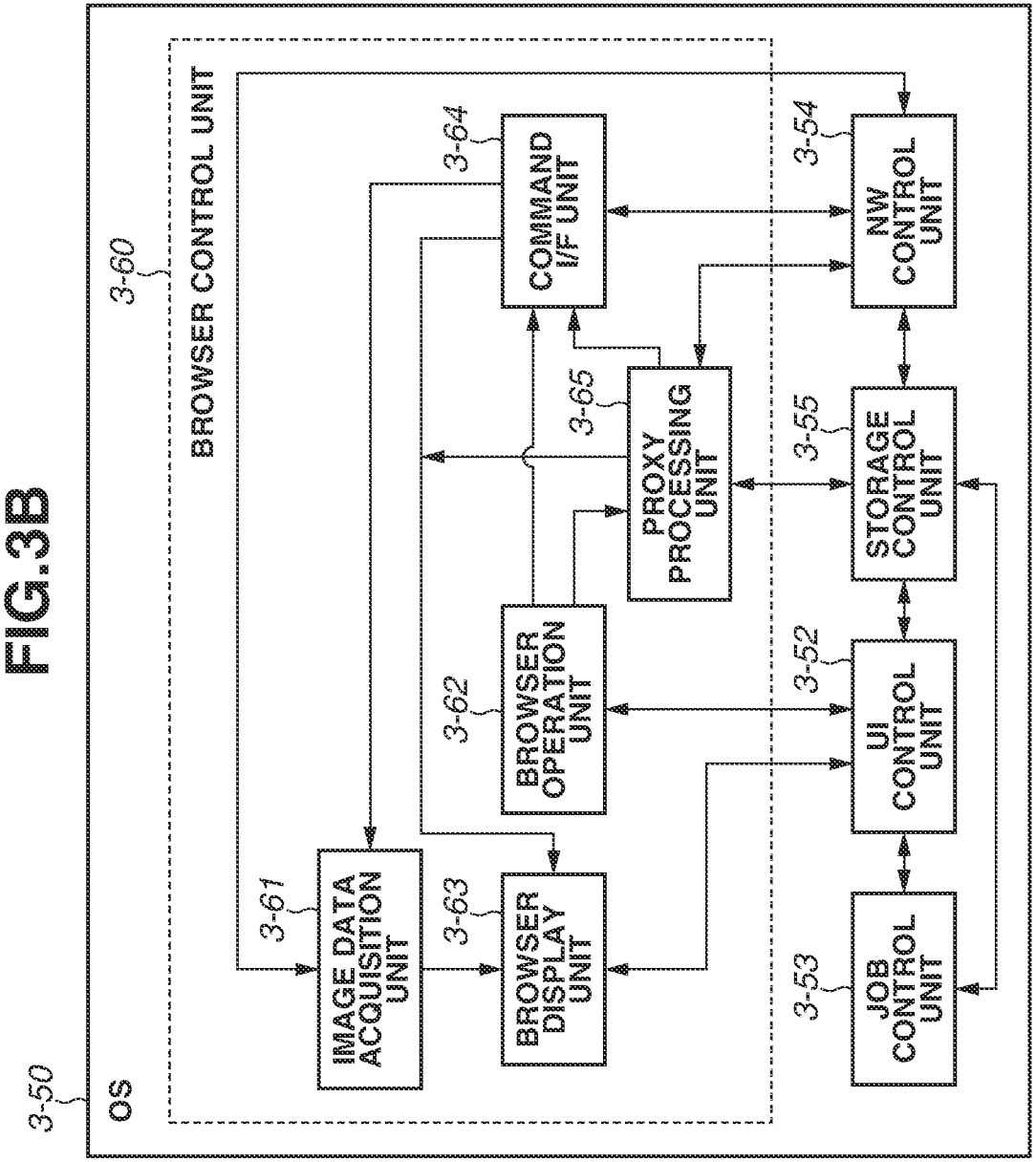
FIG. 3B is a block diagram illustrating a software configuration of the image forming apparatus.

FIG. 3B illustrates a software configuration of the image forming apparatus 1-01.

Referring to FIG. 3B, the units indicated with solid lines are software modules that are implemented when the CPU 3-01 executes a main program loaded into the RAM 3-02.

The main program manages and controls the execution of each module (described below) by an operating system 3-50.

A User Interface (UI) control unit 3-52 displays a screen on the operation unit 3-12 and accepts an operation from the user via the operation unit OF 3-06. The UI control unit 3-52 also has functions of transmitting a notification to other modules and receiving a drawing instruction from other modules to control screen updates.

A job control unit 3-53 is a module that receives a job execution instruction from the UI control unit 3-52 and controls job processing, such as copying, scanning, and printing.

A NW control unit 3-54 receives a communication request from other modules and controls the network I/F 3-10 to control communication with an external apparatus. The NW control unit 3-54 also receives a notification from an external apparatus and then notifies other modules of the content of the notification.

A storage control unit 3-55 records and manages setting information and job information recorded in the storage 3-04. Each module in the hierarchy of the OS 3-50 accesses the storage control unit 3-55 to refer to and set the setting values.

A browser control unit 3-60 is a sub module that is incorporated in the OS 3-50 and that performs control specific to the cloud browser (described below). The OS 3-50 may include any number of sub modules.

A browser operation unit 3-62 has functions of receiving a user operation notification from the UI control unit 3-52 and notifying a command OF unit 3-64 or a proxy processing unit 3-65 of the user operation.

The proxy processing unit 3-65 receives the notification from the browser operation unit 3-62 and then requests the storage control unit 3-55 to acquire proxy setting information. When the proxy setting is enabled based on the acquired proxy setting information, the proxy processing unit 3-65 makes a communication request to the proxy server 1-04 via the NW control unit 3-54. The proxy processing unit 3-65 also has functions of receiving a response to the communication request from the NW control unit 3-54 and notifying a browser display unit 3-63 or the command I/F unit 3-64 of the result of processing the content of the response.

The command I/F unit 3-64 receives the notifications from the browser operation unit 3-62 and the proxy processing unit 3-65, and makes a request for communication with the image generation server 1-30 via the NW control unit 3-54. In this case, the communication request may include notified information. The notified information includes a user operation, such as a text input, pressing of a link, scrolling, and zooming. For example, a text input includes a URL. The pressing of a link includes the coordinates where the pressing is performed on the operation unit 3-12. A scrolling or zooming operation includes a character string associated with the operation. The command I/F unit 3-64 receives communication from the image generation server 1-30 via the NW control unit 3-54. The command I/F unit 3-64 processes the received content and then makes a notification to an image data acquisition unit 3-61 or the browser display unit 3-63.

The image data acquisition unit 3-61 receives the URL of the storage 2-02 where the rendering result is stored, from the command I/F unit 3-64. The image data acquisition unit 3-61 receives an image from the URL and transfers the image to the browser display unit 3-63.

The browser display unit 3-63 receives the image from the image data acquisition unit 3-61 and then instructs the UI control unit 3-52 to draw the image. The browser display unit 3-63 receives the notifications from the command OF unit 3-64 and the proxy processing unit 3-65, and instructs the UI control unit 3-52 to draw a screen displaying the message corresponding to the notifications.

Flow of Processing to Use the System

Figure 10A:
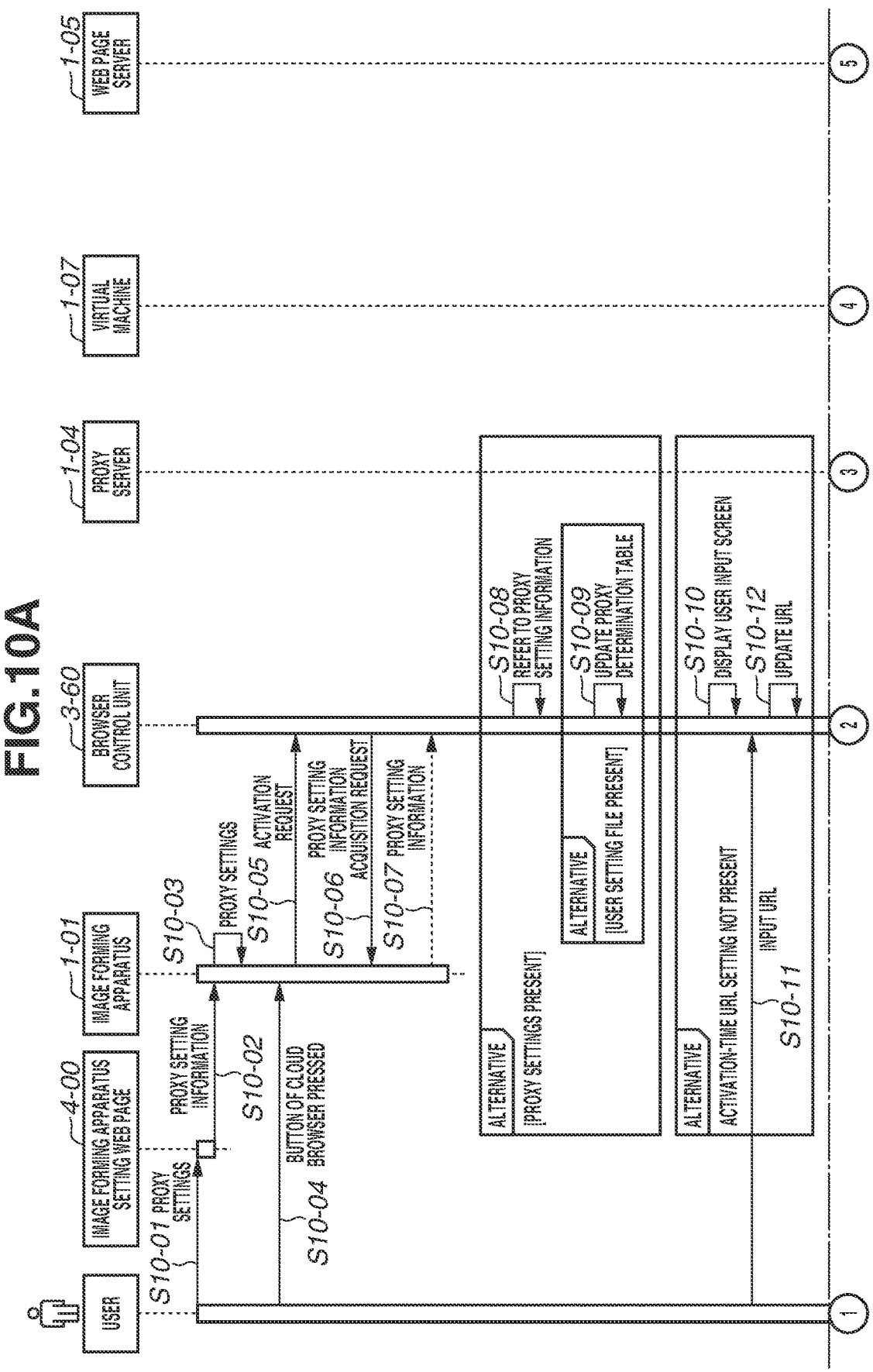
FIGS. 10A and 10B illustrate a sequence of processes to use the cloud browser system.
Figure 10B:
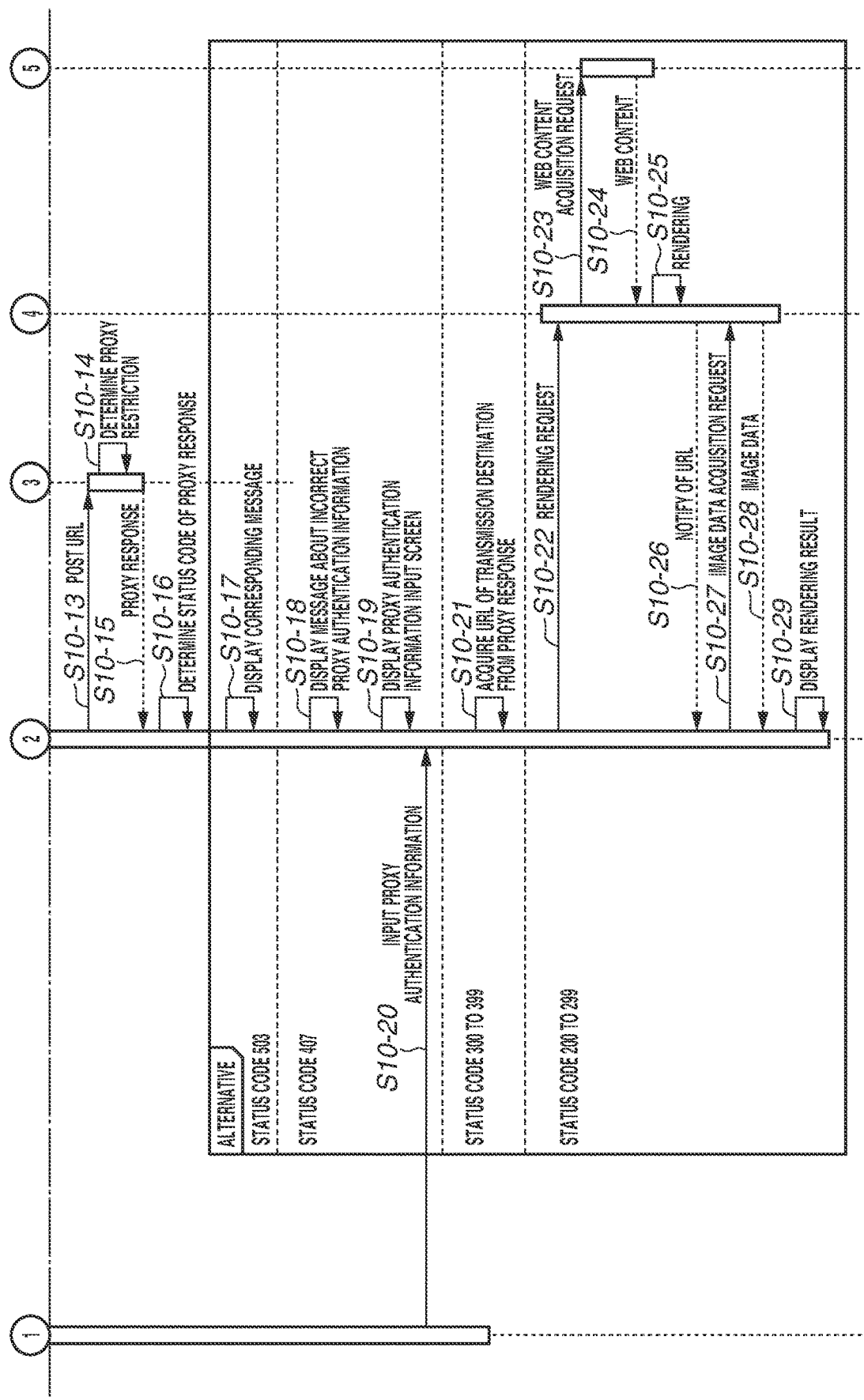

A flow of processing to use the cloud browser system 1-00 having the above-described configuration will be described below. FIGS. 10A and 10B illustrate a sequence of processes to use the cloud browser system 1-00.

In step S10-01, the user performs presetting to use the proxy server 1-04. The user performs the presetting on a setting web page provided by the web server function of the image forming apparatus 1-01. The user can access this web page by using the web browser of an information processing terminal, such as the user terminal 1-08. The setting web page will be described in detail below with reference to FIG. 4.

In step S10-02, the proxy setting information set by the user is notified to the NW control unit 3-54 via the network OF 3-10.

In step S10-03, the NW control unit 3-54 receives the notification and then records the proxy setting information in a storage 3-04 via the storage control unit 3-55.

Figure 5:
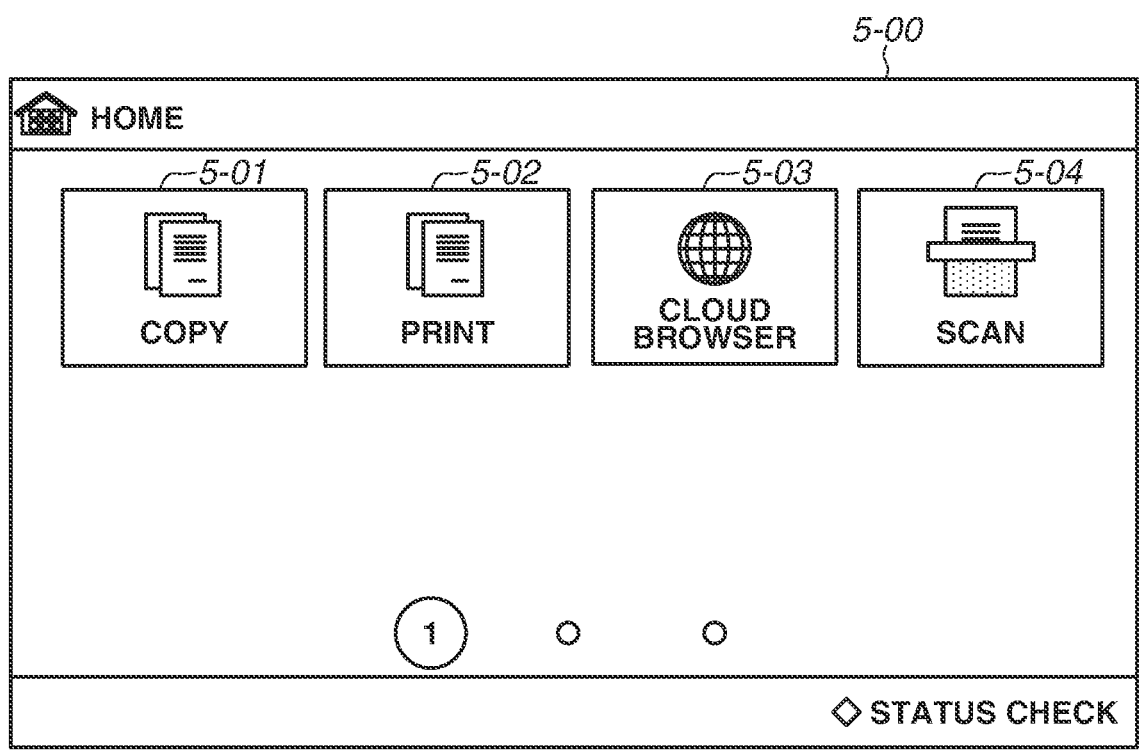
FIG. 5 illustrates an example of a home screen of the image forming apparatus.

In step S10-04, the user selects a cloud browser function in the menu screen displayed on the operation unit 3-12 of the image forming apparatus 1-01. FIG. 5 is a diagram illustrating a home menu screen displayed on the image forming apparatus 1-01. This screen is generated when the CPU 3-01 executes a program configuring the UI control unit 3-52 illustrated in FIG. 3B, and is then displayed on the operation unit 3-12. A button 5-01 relates to the copy function. A button 5-02 relates to the print function. A button 5-03 relates to the cloud browser function. A button 5-04 relates to the scanning function. When any one of the buttons is selected, the corresponding function is called. The button 5-03 is displayed on the menu screen only when the setting for using the cloud browser is completed.

In step S10-05, the operation unit OF 3-06 detects the depression of the button 5-03. Then, the CPU 3-01 loads the program of the browser control unit 3-60 that is associated with the button corresponding to the cloud browser function into the RAM 3-02, and then executes the program.

In step S10-06, to acquire the setting information recorded in the storage 3-04, the proxy processing unit 3-65 requests the storage control unit 3-55 to acquire the setting information.

In step S10-07, the storage control unit 3-55 refers to the proxy setting information in the storage 3-04 and returns the requested setting information.

When the proxy setting is enabled, then in step S10-08, the proxy processing unit 3-65 refers to a proxy setting file in the setting information. When the proxy setting file is found, then in step S10-09, the proxy processing unit 3-65 reflects the information in the proxy setting file to a proxy determination table.

Figure 6A:
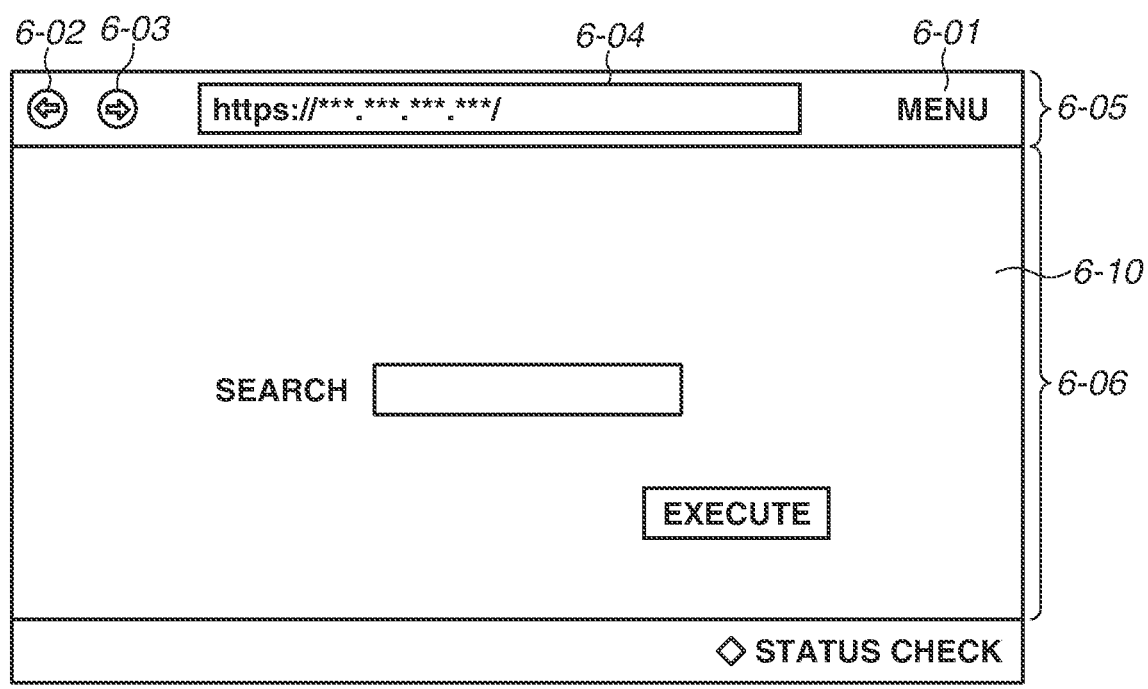
FIG. 6A illustrates an example of a screen generated by an image generation server.
Figure 6B:
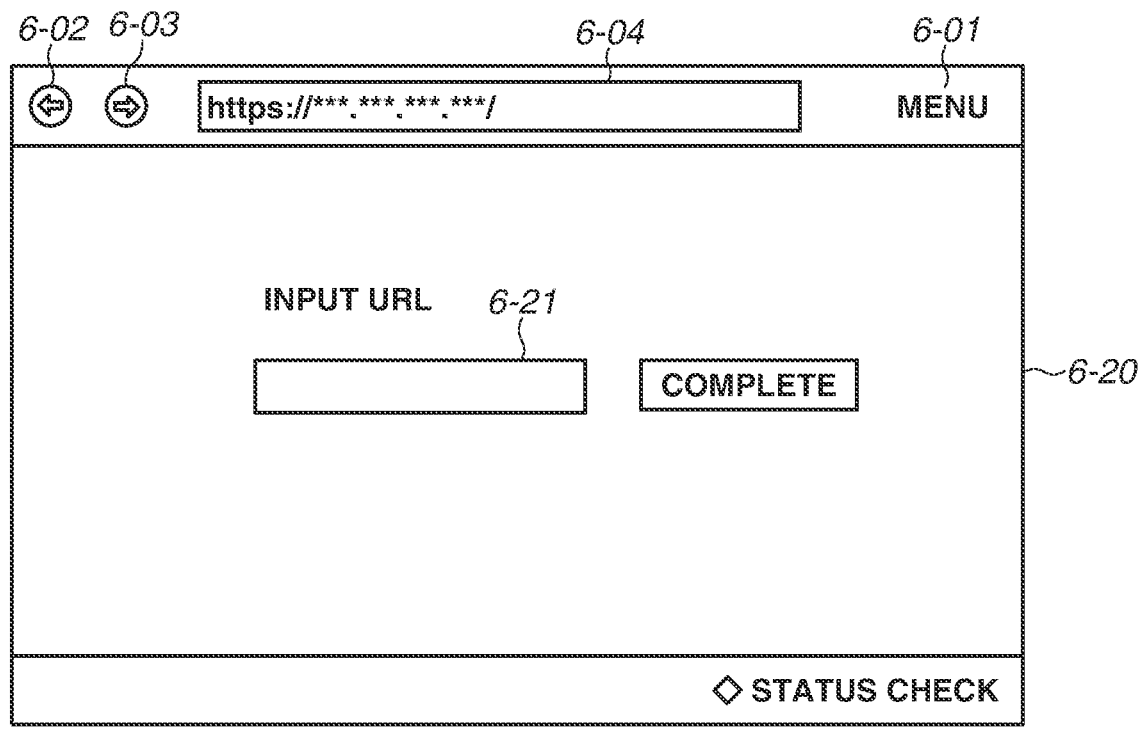
FIG. 6B illustrates an example of a Uniform Resource Locator (URL) input screen.

When an activation-time URL is not specified, then in step S10-10, the proxy processing unit 3-65 instructs the browser operation unit 3-62 to draw a screen 6-20 illustrated in FIG. 6B to accept a user input. The browser operation unit 3-62 receives the drawing instruction, and then draws the screen 6-20 in FIG. 6B via the UI control unit 3-52. The screen 6-20 in FIG. 6B is a URL input screen. The screen 6-20 is generated by the browser control unit 3-60 and can be displayed regardless of the state of connection with the virtual machine 1-07. The screen 6-20 is displayed when the display target web page is not identified. For example, the screen 6-20 is displayed when the cloud browser function is activated without setting the activation-time URL or when a predetermined time period elapses after a communication error due to the proxy server 1-04 occurs and the error information is displayed. An area 6-21 for text input is disposed in the screen 6-20. By selecting the area 6-21 and inputting a URL, the user can access the web page indicated by the URL. In step S10-11, the user operates the screen displayed on the operation unit 3-12 to input the URL of the web page that the user wants to view. In step S10-12, the operation unit OF 3-06 detects that the URL is input and then notifies the UI control unit 3-52 of the URL. The UI control unit 3-52 notifies the proxy processing unit 3-65 of the URL. The proxy processing unit 3-65 holds the notified URL and updates the input state of the URL.

In step S10-13, the proxy processing unit 3-65 transmits the URL and a communication request to the proxy server 1-04 via the NW control unit 3-54.

In step S10-14, the proxy server 1-04 determines whether to put restrictions on the received URL.

In step S10-15, the proxy server 1-04 returns a determination result as a response to the NW control unit 3-54.

In step S10-16, the NW control unit 3-54 receives the notification and then returns a response to the communication request to the proxy processing unit 3-65. The proxy processing unit 3-65 compares the status code (HyperText Transfer Protocol (HTTP) status code) in the response header from the proxy server with the proxy determination table. FIG. 9 illustrates the proxy determination table held by the cloud browser. A proxy determination table 9-00 associates a response code 9-01 with its corresponding processing content 9-02. The proxy processing unit 3-65 checks the processing corresponding to the status code, using the proxy determination table 9-00. The proxy determination table 9-00 is to be considered as illustrative, and the relation between the status code and the processing may be suitably changed depending on the design concept.

When the received status code is a predetermined status code, e.g., "status code 503", then in step S10-17, the browser display unit 3-63 receives a notification meaning "restriction" from the proxy processing unit 3-65. The browser display unit 3-63 generates a message indicating access restriction based on the notification, and then draws a screen on the operation unit 3-12 via the UI control unit 3-52.

On the other hand, when the received status code is "status code 407", then in step S10-18, the browser display unit 3-63 receives a notification meaning "proxy setting" from the proxy processing unit 3-65. The browser display unit 3-63 generates a proxy setting message, and then draws a screen on the operation unit 3-12 via the UI control unit 3-52. In step S10-19, the browser display unit 3-63 draws a proxy setting screen (not illustrated) on the operation unit 3-12 via the UI control unit 3-52. In step S10-20, the user inputs proxy authentication information via the proxy setting screen. The browser operation unit 3-62 receives a notification of a user input from the UI control unit 3-52 and then notifies the proxy processing unit 3-65 of the user input. The proxy processing unit 3-65 updates the proxy settings via the storage control unit 3-55.

When the received status code is "status code 300 to 399", then in step S10-21, the proxy processing unit 3-65 acquires the redirection destination URL in the response header. Status codes from 300 to 399 include "300 Multiple Choices", "301 Moved Permanently", "302 Found", "303 See Other", "304 Not Modified", "305 Use Proxy", "307 Temporary Redirect", and "308 Permanent Redirect".

When the received status code is "status code 200 to 299", then in step S10-22, the proxy processing unit 3-65 notifies the command OF unit 3-64 of the URL based on the processing result. Status codes from 200 to 299 include "200 OK", "201 Created", "202 Accepted", "203 Non-Authoritative Information", "204 No Content", "205 Reset Content", "206 Partial Content", "207 Multi-Status", and "226 IM Used".

In step S10-23, the command OF unit 3-64 receives the notification and then notifies the image generation server 1-30 of the URL information and user input information via the NW control unit 3-54 to request the image generation server 1-30 to render web pages. The image generation server 1-30 in the corresponding virtual machine 1-07 receives the rendering request via the gateway 1-06. The image generation server 1-30 interprets the received URL information and user input information and then notifies the browser engine 2-51 of the information. Based on the notified information, the browser engine 2-51 accesses the web page server 1-05 via the gateway 1-06 and makes a request for acquiring the web content.

In step S10-24, the web page server 1-05 returns the requested web content. In step S10-25, the drawing control unit 2-52 performs rendering on the web content acquired by the browser engine 2-51 and stores the generated image data as a rendering result in the storage 2-02 via the NW control unit 2-53. In step S10-26, the virtual machine 1-07 notifies a NW transmission/reception unit (not illustrated) of the URL of the storage 2-02 that stores the image data. In step S10-27, the NW transmission/reception unit receives the notification and then notifies the command OF unit 3-64 of the URL via the NW control unit 3-54. The command OF unit 3-64 receives the notification and then notifies the image data acquisition unit 3-61 of the URL. The image data acquisition unit 3-61 accesses the virtual machine 1-07 via the NW control unit 3-54, using the notified URL. Then, the image data acquisition unit 3-61 transmits an image acquisition request to the virtual machine 1-07. In step S10-28, the virtual machine 1-07 receives the image acquisition request and then returns image data as a response to the request. In step S10-29, the image data acquisition unit 3-61 receives the response from the NW control unit 3-54 and then acquires the image data. Then, the image data acquisition unit 3-61 transfers the image data to the browser display unit 3-63. The browser display unit 3-63 make a rendering request to the UI control unit 3-52 so as to display the acquired image on the operation unit 3-12. Accordingly, the web content is displayed on the operation unit 3-12 of the image forming apparatus 1-01. For example, a page of a web search service is displayed as an example of the web content.

FIG. 6A illustrates a state of viewing a web page, using the cloud browser system 1-00. As illustrated in FIG. 6A, the browser display screen displayed by the browser display unit 3-63 includes a basic information area 6-05 and a page display area 6-06. The basic information area 6-05 includes buttons 6-01, 6-02, and 6-03, and a character string display area 6-04.

The menu button 6-01 is a button used to refer to the favorite and history, which is one of the browser functions. When the user selects the menu button 6-01, for example, a pop-up screen appears to allow the user to view a web page registered in the favorite and the history of web pages that have been viewed.

The button 6-02 is used to restore the display state of the page display area 6-06 to the previous page. When the user presses the button 6-02, the rendering result of the previously displayed web page appears in the page display area 6-06.

The button 6-03 is used to proceed the display state of the page display area 6-06 to the next page. When the user presses the button 6-03, the rendering result of the next web page appears in the page display area 6-06. The character string display area 6-04 displays the URL and title of the currently displayed web page.

The page display area 6-06 displays the screen rendered by the virtual machine 1-07 or a message internally generated by the browser display unit 3-63. FIG. 6A illustrates a state where an image 6-10 as the result of rendering the page of the web search service by the virtual machine 1-07 appears in the page display area 6-06. The image data acquisition unit 3-61 acquires the image data from the virtual machine 1-07, and the browser display unit 3-63 instructs the UI control unit 3-52 to draw the acquired image, whereby a browsing screen is drawn in the page display area 6-06. When the user selects the link in the image 6-10 as the rendering result, the proxy processing unit 3-65 requests the image generation server 1-30 to render the web page on the link destination. Subsequently, the rendering result is acquired like the above-described processing, and the screen of the web page on the link destination appears in the page display area 6-06.

Proxy Setting

FIG. 4 illustrates a setting screen of the cloud browser system 1-00. This setting screen can be viewed from an external apparatus if the screen is provided as a web page using the server function of the image forming apparatus 1-01. For example, if a specific URL is input to the web browser, the user terminal 1-08 connected via the same network line can display a setting screen 4-00. The processing in step S10-01 is performed using this setting screen. The setting screen 4-00 may be directly displayed on the operation unit 3-12 without being converted to web page information.

The setting screen 4-00 includes setting items 4-01, 4-02, 4-03, 4-04, and 4-05.

The setting item 4-01 is used to set the use of the cloud browser function to ON or OFF. When the user checks the check box of the setting item 4-01, the use of the cloud browser function is set to ON, and the button 5-03 for the cloud browser appears in a screen 5-00. On the other hand, when the user unchecks the check box of the setting item 4-01, the use of the cloud browser function is set to OFF, and the button 5-03 for the cloud browser disappears from the screen 5-00. The setting item 4-01 is the item to be operated first in the setting screen 4-00. If the user checks the check box of the setting item 4-01, the user is allowed to operate other items.

The setting item 4-02 is used to set whether to use the proxy. In an environment where a proxy is used to access the Internet, the user checks the check box of the setting item 4-02 and sets host and port information for the proxy.

The setting item 4-03 is used to set authentication information for proxy authentication. In an environment where authentication is required to use the proxy, the user checks the check box of the setting item 4-03 to specify proxy authentication information (identifier (ID) and password).

The setting item 4-04 is used to set the activation-time URL. When the user checks the check box of the setting item 4-04 and inputs a URL in the entry field, the user is allowed to automatically access the specified URL when the application is activated. The information set in this screen is notified via the network OF 3-10 and recorded in the storage 3-04.

The setting item 4-05 is used to issue an instruction for reading the proxy setting file. When the user checks the check box of the setting item 4-05 and specifies a text file in the file specification field, the file is read, and the user can change the settings of the proxy determination table 9-00. Like the proxy determination table 9-00, a status code and its corresponding processing are described in this text file. Control FIG. 7 is a flowchart illustrating processing performed by the image forming apparatus 1-01 and the virtual machine 1-07. In the processing illustrated in FIG. 7, the processing steps in the image forming apparatus 1-01 are implemented by the controller unit 3-00. More specifically, the processing steps are implemented when a program stored in the ROM 3-03 or the storage 3-04 is loaded into the RAM 3-02 and then executed by the CPU 3-01. In the processing illustrated in FIG. 7, the processing steps in the virtual machine 1-07 are implemented when a program stored in the storage 2-02 is loaded into the RAM 2-03 and then executed by the CPU 2-01.

In step S7-01, the proxy processing unit 3-65 refers to the storage control unit 3-55 to acquire the access target URL. This URL is the URL specified in the setting item 4-04 or the URL specified by the user.

In step S7-02, the proxy processing unit 3-65 performs a proxy sub-flow. The proxy sub-flow will be described in detail below.

In step S7-11, the proxy processing unit 3-65 determines whether the result of the proxy sub-flow is a normal end. When the result of the proxy sub-flow is a normal end (YES in step S7-11), the processing proceeds to step S703. On the other hand, when the result of the proxy sub-flow is an abnormal end (NO in step S7-11), the processing in the flowchart is ended.

In step S7-03, the proxy processing unit 3-65 notifies the command OF unit 3-64 of the URL acquired in step S7-01. The command OF unit 3-64 transmits a rendering request to the virtual machine 1-07 based on the notification.

In step S7-04, the image generation server 1-30 in the virtual machine 1-07 receives the rendering request via the gateway 1-06. The image generation server 1-30 interprets the received user input information and then notifies the browser engine 2-51 of the information.

In step S7-05, the browser engine 2-51 acquires the web content via the gateway 1-06 based on the notified information.

In step S7-06, the drawing control unit 2-52 performs rendering based on the web content acquired by the browser engine 2-51.

In step S7-07, the image data as the rendering result generated in step S7-06 is stored in the storage 2-02 via the NW control unit 2-53.

In step S7-08, the NW control unit 2-53 notifies the NW transmission/reception unit (not illustrated) in the image forming apparatus 1-01 of the URL of the storage 2-02 storing the rendering result. Then, the command OF unit 3-64 receives the notification from the NW transmission/reception unit and then notifies the image data acquisition unit 3-61 of the URL.

In step S7-09, the image data acquisition unit 3-61 requests the NW control unit 3-54 to perform communication to the notified URL and then acquires the image data as the rendering result.

In step S7-10, the image data acquisition unit 3-61 transfers the acquired image data to the browser display unit 3-63. The browser display unit 3-63 instructs the UI control unit 3-52 to draw a screen including the image data.

A series of processing in the cloud browser system 1-00 is performed in the above-described manner.

Figure 8:
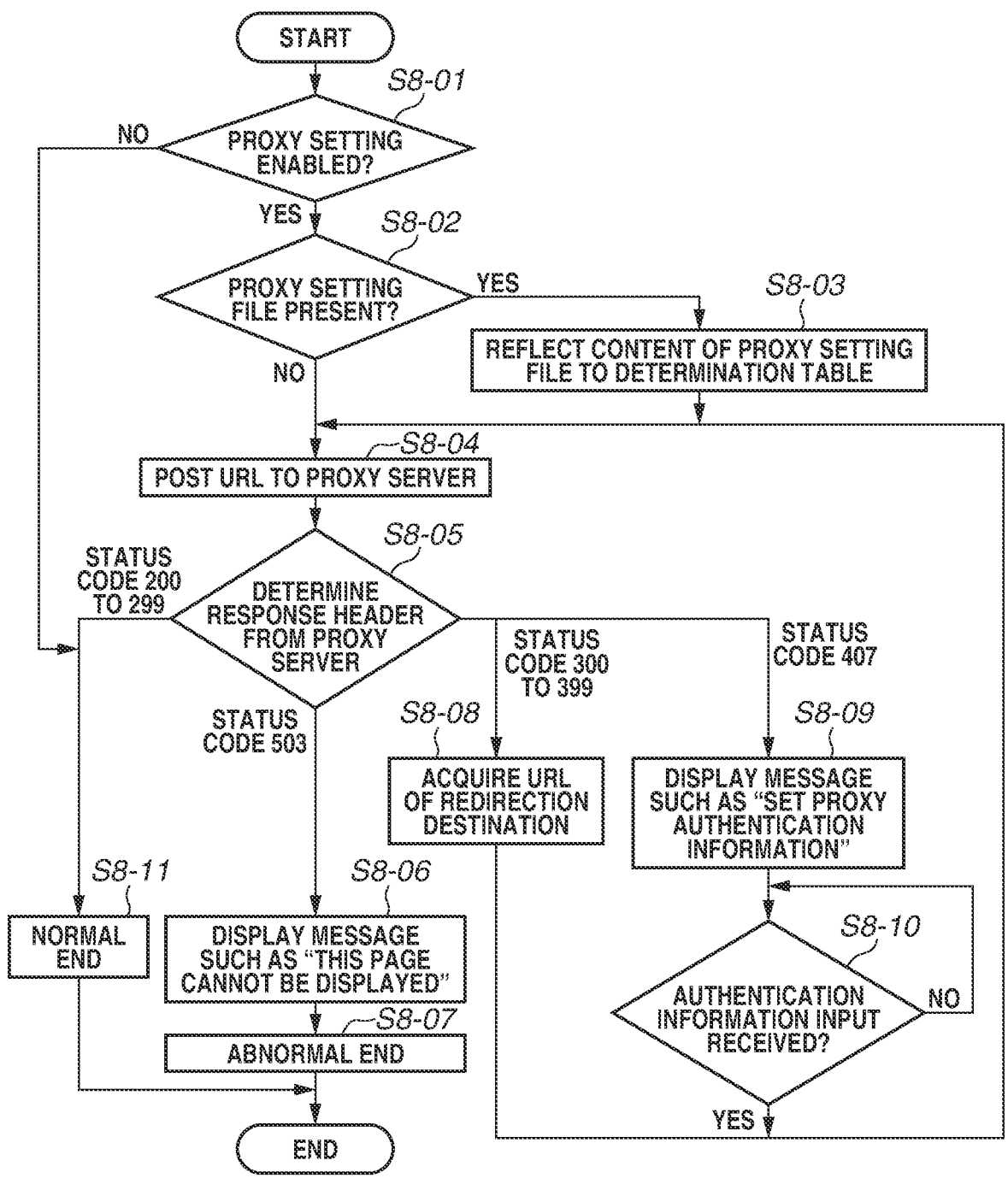
FIG. 8 is a flowchart illustrating processing in a proxy sub-flow performed by the image forming apparatus.

The proxy sub-flow will be described in detail below. FIG. 8 is a flowchart illustrating processing in the proxy sub-flow performed by the image forming apparatus 1-01.

In step S8-01, the proxy processing unit 3-65 refers to the storage control unit 3-55 to determine whether the proxy setting is enabled. When the proxy setting is enabled (YES in step S8-01), the processing proceeds to step S8-02. On the other hand, when the proxy setting is disabled (NO in step S8-01), the processing proceeds to step S8-11. In step S8-11, the processing is normally ended, and then the processing in the sub-flow is ended.

In step S8-02, the proxy processing unit 3-65 refers to the storage control unit 3-55 to determine whether the proxy setting file is set. When the proxy setting file is not set (NO in step S8-02), the processing proceeds to step S8-04. On the other hand, when the proxy setting file is set (YES in step S8-02), the processing proceeds to step S8-03. In step S8-03, the proxy processing unit 3-65 reflects the content of the proxy setting file to the proxy determination table 9-00.

In step S8-04, the proxy processing unit 3-65 requests the NW control unit 3-54 to make a request to the proxy server 1-04 to perform communication to the URL. The proxy processing unit 3-65 receives, from the NW control unit 3-54, a response to the request from the proxy server 1-04.

In step S8-05, the proxy processing unit 3-65 make a determination based on the status code in the response header acquired from the proxy server 1-04 and the proxy determination table 9-00. When the received status code is "status code 200 to 299" (STATUS CODE 200 TO 299 in step S8-05), the processing proceeds to step S8-11. In step S8-11, the processing is normally ended, and the processing in the sub-flow is ended.

When the received status code is "status code 503" (STATUS CODE 503 in step S8-05), the processing proceeds to step S8-06. In step S8-06, the proxy processing unit 3-65 generates a message indicating "restriction", and then draws an image on the operation unit 3-12 via the UI control unit 3-52. Then, the processing proceeds to step S8-07. In step S8-07, the processing is abnormally ended, and the processing in the sub-flow is ended.

When the received status code is "status code 300 to 399" (STATUS CODE 300 TO 399 in step S8-05), the processing proceeds to step S8-08. In step S8-08, the proxy processing unit 3-65 acquires the redirection destination URL in the response header. Then, the processing returns to step S8-04.

When the received status code is "status code 407" (STATUS CODE 407 in step S8-05), the processing proceeds to step S8-09. In step S8-09, the proxy processing unit 3-65 generates a message prompting the user to make the proxy authentication setting, and then draws an image on the operation unit 3-12 via the UI control unit 3-52. When an authentication information input is not received (NO in step S8-10), the proxy processing unit 3-65 waits until the authentication information input is received. On the other hand, when the authentication information input is received (YES in step SS8-10), the processing returns to step S8-04.

Remarks

As described above, according to the present exemplary embodiment, a rendering request is made to the image generation server 1-30 using the URL about which an inquiry has been made to the proxy server 1-04. With the configuration, web content to be viewed by the cloud browser system 1-00 can be restricted based on the restriction rules of the proxy server 1-04. This makes it possible to improve security of the image forming apparatus 1-01 on the intranet 1-20.

Other Embodiments

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure is applicable to a system including a plurality of devices and to an apparatus including one device. For example, the above-described functions may be implemented by executing some of the software modules by an external server, and acquiring a result of processing performed by the external server.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-106862, which was filed on Jul. 1, 2022 and which is hereby incorporated by reference herein in its entirety.

What is claimed is:

1. A web browser system comprising:
a communication terminal;
an image generation server configured to render a web page; and
a proxy server configured to perform access restrictions to one or more websites accessed via the proxy server from the communication terminal,
wherein the communication terminal includes:
a display;
one or more memories; and
one or more processors, wherein the one or more processors and the one or more memories are configured to:
acquire a Uniform Resource Locator (URL) of an access destination;
notify the proxy server of the URL;
receive a status code about an access on the URL from the proxy server;
transmit a request including the URL to the image generation server for causing the image generation server to render an image of the web page corresponding to the URL in a case where the received status code is a first status code indicating that the access on the URL is permitted;
receive, from the image generation server, data including the image of the web page corresponding to the URL;
display the image of the web page corresponding to the URL on the display;
in a case where the received status code is a second status code different from the first status code, generate a notification by a software module of the communication terminal without transmitting the request including the URL to the image generation server; and
display the generated notification on the display.

2. A communication terminal that communicates with an image generation server and a proxy server, the communication terminal comprising:
a display;
one or more memories; and
one or more processors, wherein the one or more processors and the one or more memories are configured to:
acquire a Uniform Resource Locator (URL) of an access destination;
notify the proxy server of the URL;
receive a status code about an access on the URL from the proxy server;
transmit a request including the URL to the image generation server for causing the image generation server to render an image of a web page corresponding to the URL in a case where the received status code is a first status code indicating that the access on the URL is permitted;
receive, from the image generation server, data including the image of the web page corresponding to the URL;
display the image of the web page corresponding to the URL on the display:
in a case where the received status code is a second status code different from the first status code, generate a notification by a software module of the communication terminal without transmitting the request including the URL to the image generation server; and
display the generated notification on the display.

3. The communication terminal according to claim 2, wherein the first status code is a HyperText Transfer Protocol (HTTP) status code from 200 to 299.

4. The communication terminal according to claim 2, wherein the one or more processors and the one or more memories are further configured to acquire a URL of a redirection destination in a case where the received status code is a third status code different from the first and second status codes,
 wherein the third status code is an HTTP status code from 300 to 399.

5. The communication terminal according to claim 2, wherein the notification is an error notification, and
 wherein the second status code is an HTTP status code 503.

6. The communication terminal according to claim 2, wherein the one or more processors and the one or more memories are further configured to perform processing for a proxy authentication setting in a case where the received status code is the second status code,
 wherein the second status code is an HTTP status code 407.

7. The communication terminal according to claim 2, further comprising an image forming unit configured to form an image on a sheet.

8. The communication terminal according to claim 2, further comprising an image reading unit configured to read an image from a document.

9. A method for controlling a communication terminal that communicates with an image generation server and a proxy server, the method comprising:

acquiring a Uniform Resource Locator (URL) of an access destination;
notifying the proxy server of the URL;
receiving a status code about an access on the URL from the proxy server;
transmitting a request including the URL to the image generation server for causing the image generation server to render an image of a web page corresponding to the URL in a case where the received status code is a first status code indicating that the access on the URL is permitted;
receiving, from the image generation server, data including the image of the web page corresponding to the URL;
displaying the image of the web page corresponding to the URL on a display of the communication terminal;
in a case where the received status code is a second status code different from the first status code, generating a notification by a software module of the communication terminal without transmitting the request including the URL to the image generation server; and
displaying the generated notification on the display of the communication terminal.

\* \* \* \* \*